Nov. 6, 1951 C. T. ASBURY 2,573,784
APPARATUS FOR DISPENSING MATERIALS
Filed Jan. 10, 1950 2 SHEETS—SHEET 1
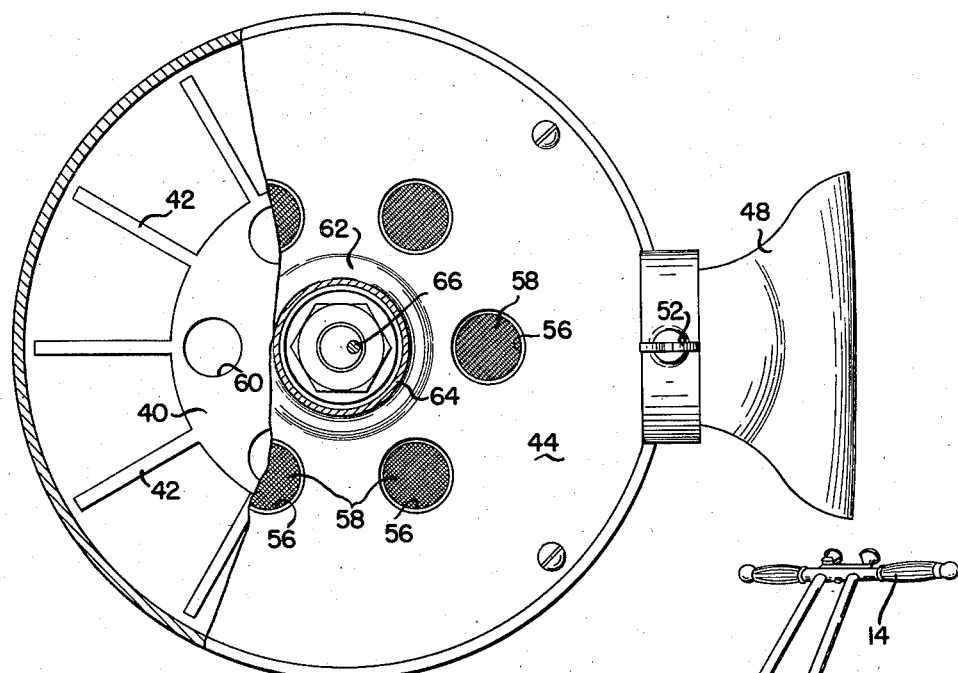
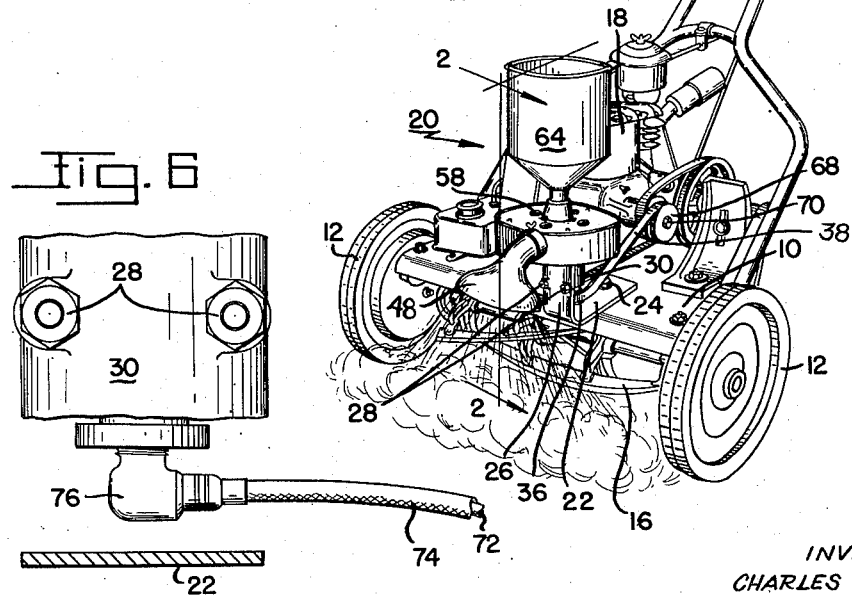
INVENTOR
CHARLES T. ASBURY
By
Toulmin & Toulmin
ATTORNEYS.

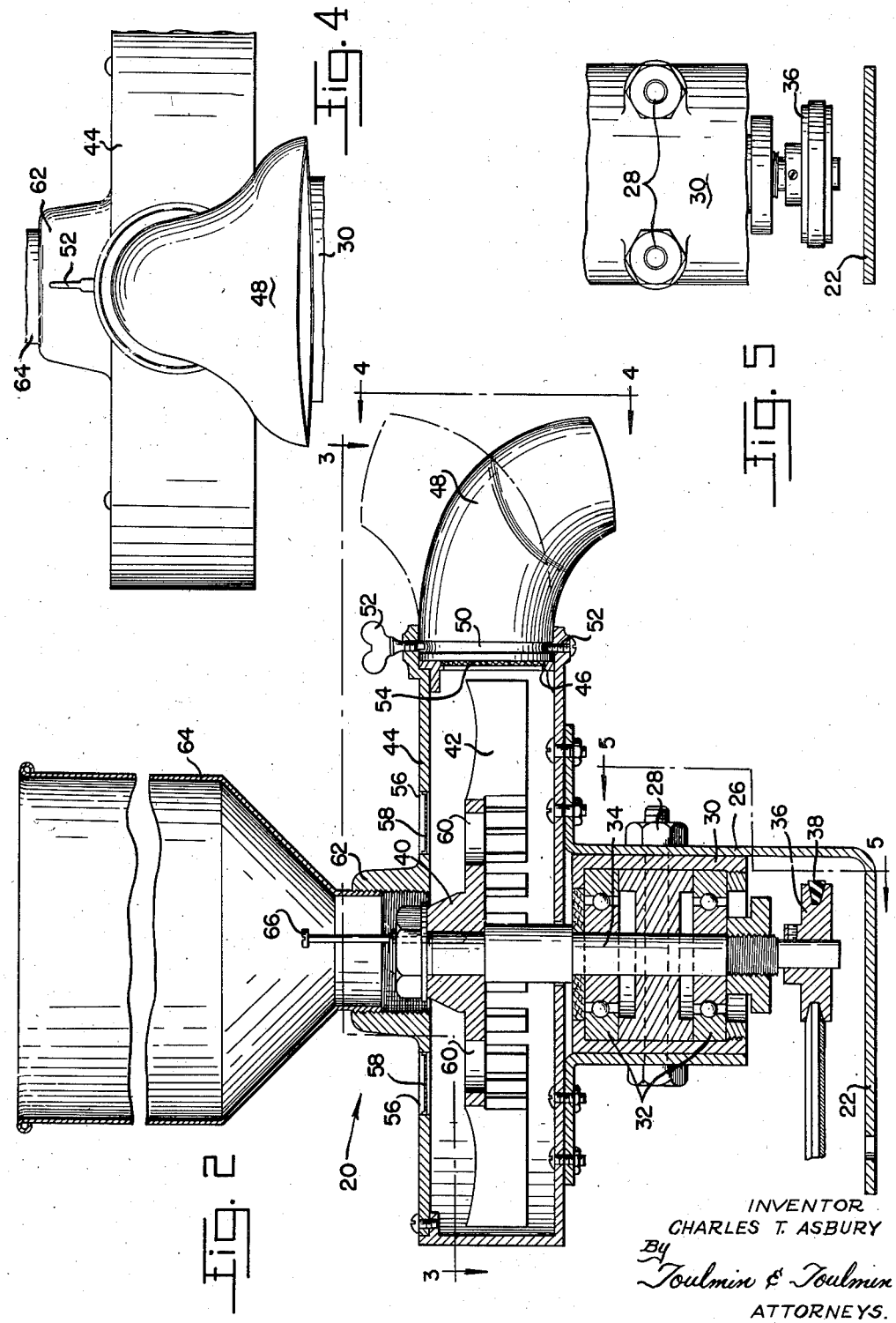

Patented Nov. 6, 1951

2,573,784

UNITED STATES PATENT OFFICE 2,573,784

APPARATUS FOR DISPENSING MATERIALS

Charles T. Asbury, Fort Lauderdale, Fla.

Application January 10, 1950, Serial No. 137,846

5 Claims. (Cl. 275—8)

This invention relates to a method and apparatus for dispensing materials such as fertilizer, insecticides, and fungicides. More particularly still, this invention pertains to a device adapted for being mounted on a lawn mower or the like, and to a method of operating the device such that it will dispense materials of the nature of fertilizer, insecticides and fungicides.

In the maintenance of lawns, shrubbery, bushes, hedges, and similar vegetation, it is often desirable to spray them with fungicides or insecticides, or to supply fertilizer to the soil thereabout. This is usually accomplished by utilizing special spray equipment when the material being dispensed is liquid, or special distributing mechanisms when the material being distributed is in the form of a powder. In either case, a rather expensive auxiliary equipment having no utility for any other purpose is required.

Similarly, with the application of weed killers and other chemicals, special equipment is required in order to do a thorough and effective job of application.

The particular object of the instant invention is to provide an attachment for a lawn mower or the like operable for dispensing materials such as described above.

A still further object of this invention is to provide an attachment for a lawn mower or the like which will dispense materials of the nature referred to in any desired direction and which will distribute the materials over a large area if desired.

A particular object is to provide an attachment for a lawn mower which can be utilized to dispense material over the lawn at the same time the grass is being cut, thereby saving an extra operation.

These and other objects and advantages will become more apparent upon reference to the following description taken in connection with the accompanying drawings, in which:

Figure 1 is a perspective view of a lawn mower having an attachment mounted thereon in accordance with the teachings of this invention;

Figure 2 is a vertical section through the attachment and is indicated by line 2—2 on Figure 1;

Figure 3 is a plan view partly in section looking down on top of the fan part of the dispensing device as indicated by line 3—3 on Figure 2;

Figure 4 is a view looking in from the nozzle end of the dispenser as indicated by line 4—4 on Figure 2;

Figure 5 is a view indicated by line 5—5 on Figure 2; and

Figure 6 is a fragmentary view like Figure 5, but showing a modified construction.

Referring to the drawings somewhat more in detail, there is shown in Figure 1 a power lawn mower comprising the usual frame 10 having ground wheels 12, a handle 14, and a cutting reel 16. The lawn mower has a motor 18 that drives into the reel and ground wheels in the usual manner.

Mounted on the frame of the machine in front of motor 18 is the attachment of the present invention, indicated generally by the reference number 20. The attachment comprises a member 22 bolted to the frame, as by bolts 24, and including an upstanding part 26 at the front end through which bolts 28 pass for supporting the vertical spindle housing 30.

Reference at this time to Figure 2 will reveal that spindle housing 30 provides support for a pair of spaced anti-friction bearings 32 that receive drive shaft 34. At its lower end drive shaft 34 carries a pulley 36 over which runs V-belt 38.

At its upper end shaft 34 carries a fan wheel 40 having blades 42 on its underneath side. Fan wheel 40 runs in a housing or volute 44 having a discharge opening at 46 communicating with a detachable nozzle 48. Nozzle 48 is adapted for being rotated about its engagement with housing 44 by means of groove 50 in the nozzle into which extend a plurality of screws 52, the uppermost one of which can be utilized as a clamping screw for locking the nozzle in position.

Disposed between the nozzle and interior of housing 44 is a screen member 54 by means of which all material passing out through the nozzle is in a very fine state. Any large particles of material that are thrown against the screen are either broken up when they strike the screen or are subsequently broken up by the air passing through the screen or by other material thrown out by the fan.

The air supply to the fan enters housing 44 through its top face by means of a plurality of apertures 56 which are preferably screened, as by the screen members 58. The back plate of the fan wheel 40 also has apertures therein as at 60 and normally, the larger part of the air entering the fan will pass through the apertures 60 to be acted upon by blades 42. The purpose of so arranging the fan wheel with its back plate on top and fan blades underneath is that when dry materials are dispensed, this arrangement of the fan wheel prevents an accumulation of material around the shaft at the bottom of housing 44. Such an accumulation of material will not only cause foreign matter to enter the bearings but can even cause the shaft and fan wheel to seize in the housing and thus cause the device to become inoperative or damaged.

The top plate of housing 44 has an upstanding threaded part 62 and threaded therein is a hopper 64 for holding material to be dispensed. Inasmuch as dry fertilizer, insecticides, fungicides, and the like, are often of such nature that they tend to bridge up in the hopper, I have provided a feeding means comprising the pin 66 eccentrically located in the upper end of shaft 34 and extending up through the mouth of the hopper into the tapered lower end thereof. It will be evident that whenever shaft 34 is turning, the material in the hopper will be caused to feed downwardly toward the fan wheel where it will be thrown outwardly by centrifugal force by the fan wheel until it is picked up by the air stream through the fan and blown out through nozzle 48.

Turning again now to Figure 1, it will be noted that the device of this invention can very readily be driven by carrying V-belt 38 backwardly from pulley 36, giving it a 90 degree twist, and then passing it over an auxiliary pulley 68 on the end of the motor driven shaft 70. This motor driven shaft, of course, could be selectively clutched to or unclutched from the motor, if so desired, in order to make the dispensing device selectively operable.

In Figure 6 there is shown a modified arrangement where the shaft 34 is adapted for being driven by the flexible drive comprising drive cable 72 and cable housing 74, which is connected with a fitting 76 containing suitable gearing for interconnecting shaft 34 with drive cable 72. The driving arrangement of Figure 6 is to be preferred in certain instances where it is not possible to locate the device where a V-belt can be utilized, or when a device is utilized separately from a lawn mower, and must, accordingly, be driven by an electric motor or some other power means.

In Figure 1 it will be noted that discharge of material from the device is directed generally downwardly toward the ground and that, normally, the material strikes the ground with considerable velocity, thereby insuring that it will be thoroughly applied not only to the ground but to the vegetation growing in the ground.

In certain instances where it may be desired to apply insecticides or fungicides to shrubs or bushes, the nozzle 48 may be rotated from its Figure 1 position so as to direct the spray laterally or in whatever direction necessary to obtain proper coverage of the vegetation being sprayed.

In certain other instances it may be desirable to direct the spray outwardly, and in this case, the nozzle 48 can be turned completely over as indicated with the dot-dash outline in Figure 2.

It will also be evident that the dispensing device according to this invention can be utilized for other purposes, such as spreading rock salt on icy walks and drives, for applying animal repellants to shrubs, for certain seeding operations, and many other instances where a material is to be spread or dispensed.

It will be understood that this invention is susceptible to modification in order to adapt it to different usages and conditions, and, accordingly, it is desired to comprehend such modifications within this invention as may fall within the scope of the appended claims.

I claim:

1. In a dispensing device; a generally horizontally disposed fan housing, a vertical shaft extending into said housing and an impeller on the shaft in said housing, said impeller having a back plate adjacent the upper wall of the housing and fan blades dependent therefrom, the upper wall of said housing being formed with a central opening coaxial with said shaft, a hopper mounted in said opening and a feed pin eccentrically mounted on said shaft and extending through said opening into the hopper, a plurality of air inlet apertures in the upper wall of said housing disposed about said opening and adjacent the periphery of said back plate, and a peripheral discharge opening in said housing, said inlet openings and discharge opening being screened.

2. In a dispensing device; a generally horizontally disposed fan housing, a support bracket secured to said housing, a spindle housing secured to said support bracket, a shaft journaled in said spindle housing and extending vertically into said fan housing, an impeller on said shaft in the fan housing having a back plate adjacent to the upper wall of the housing and fan blades extending therefrom toward the lower wall of the housing, the upper wall of the fan housing being formed with a central opening coaxial with said shaft, a hopper mounted in said opening, a pin eccentrically mounted in the end of said shaft and extending through said opening into said hopper, a plurality of screened inlet openings in the upper wall of the fan housing disposed about the said center opening, a plurality of circumferentially spaced openings in the back plate of said impeller, a screened discharge opening in the periphery of said fan housing, and a nozzle adjustably mounted in said discharge opening for directing the discharge of material from said device.

3. In a dispensing device; a substantially cylindrical fan housing having its axis vertical and having a peripheral discharge opening, a shaft extending axially into said housing from beneath, an impeller on said shaft in the housing having a back plate adjacent the upper wall of the housing and having fan blades extending radially from the periphery thereof and dependent below the plane of said back plate, the upper wall of the housing being formed with a central opening coaxial with said shaft, a hopper fitted into said opening for supplying material thereto to be dispensed, said impeller having a hub portion projecting therefrom toward said opening, and a plurality of circumferentially spaced inlet openings in the upper wall of said housing disposed about the said central opening therein and positioned outwardly therefrom adjacent the periphery of said back plate.

4. In a dispensing device; a substantially cylindrical fan housing having its axis vertical and having a peripheral discharge opening, a shaft extending axially into said housing from beneath, an impeller on said shaft in the housing having a back plate adjacent the upper wall of the housing and having fan blades extending radially from the periphery thereof and dependent below the plane of said back plate, the upper wall of the housing being formed with a central opening coaxial with said shaft, a hopper fitted into said opening for supplying material thereto to be dispensed, said impeller having a hub portion projecting therefrom toward said opening, a plurality of circumferentially spaced inlet openings in the upper wall of said housing disposed about the said central opening therein and positioned outwardly therefrom adjacent the periphery of said back plate, and a plurality of circumferentially spaced apertures in said back plate in substantial vertical alignment with the said inlet openings in the housing.

5. In a dispensing device; a centrifugal fan comprising a horizontally disposed housing having a peripheral discharge opening, an impeller in said housing rotatable on a vertical axis and having a back plate adjacent the upper wall of the housing and having blades extending outwardly from about the periphery thereof, air inlet means in the said upper wall circumferentially spaced thereabout adjacent the periphery of said back plate to admit air into the housing over an annular zone outwardly from the center of the impeller whereby the air flow through said housing is from said air inlet means toward the outer part of said housing, and thence through said discharge opening, and means to introduce material to be dispensed axially through the said upper wall of said housing to the center of said back plate of the impeller whereby the material is centrifugally distributed by the said impeller before it is picked up by the air stream passing through said housing.

CHARLES T. ASBURY.

REFERENCES CITED

The following references are of record in the file of this patent:

UNITED STATES PATENTS

| Number | Name | Date |
|---|---|---|
| 540,102 | Kirshman | May 28, 1895 |
| 921,101 | Griswold | May 11, 1909 |
| 1,292,391 | Dougherty | Jan. 21, 1919 |
| 1,625,353 | Dugan | Apr. 19, 1927 |
| 1,674,391 | Dunnagan | June 19, 1928 |
| 1,876,409 | Gordon | Sept. 6, 1932 |
| 1,899,181 | Corolus | Feb. 28, 1933 |
| 1,987,656 | Althouse et al. | Jan. 15, 1935 |
| 2,044,884 | Keller | June 23, 1936 |
| 2,409,270 | Glessner | Oct. 15, 1946 |
| 2,476,465 | Tarrant | July 19, 1949 |

FOREIGN PATENTS

| Number | Country | Date |
|---|---|---|
| 1,495/26 | Australia | Apr. 19, 1926 |

OTHER REFERENCES

Popular Science Publication, page 92, published September 1949.